United States Patent
Kubinski

(10) Patent No.: US 7,730,705 B2
(45) Date of Patent: Jun. 8, 2010

(54) ELECTRO-HYDRAULIC LIFT MECHANISM FOR LAWN MOWER DECK

(75) Inventor: Paul Thomas Kubinski, Brooklyn Park, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 175 days.

(21) Appl. No.: 11/738,064

(22) Filed: Apr. 20, 2007

(65) Prior Publication Data
US 2008/0256918 A1  Oct. 23, 2008

(51) Int. Cl.
*A01D 34/00* (2006.01)
(52) U.S. Cl. .......................... 56/17.1; 56/15.7; 56/15.8
(58) Field of Classification Search ............... 56/10.2 E, 56/11.9, 14.9, 15.1–15.3, 17.1, 15.7, 15.8
See application file for complete search history.

(56) References Cited

U.S. PATENT DOCUMENTS

| | | | | |
|---|---|---|---|---|
| 2,525,047 A | * | 10/1950 | Sawtelle et al. | 56/7 |
| 3,063,226 A | * | 11/1962 | Pfauser | 56/15.3 |
| 3,559,385 A | * | 2/1971 | Eaton | 56/10.7 |
| 3,601,958 A | * | 8/1971 | Roof | 56/13.7 |
| 4,304,086 A | * | 12/1981 | Stuchl | 56/6 |
| 4,518,043 A | * | 5/1985 | Anderson et al. | 172/6 |
| 4,622,803 A | * | 11/1986 | Lech | 56/10.2 E |
| 5,483,789 A | * | 1/1996 | Gummerson | 56/15.5 |
| 5,784,870 A | * | 7/1998 | Seegert et al. | 56/320.1 |
| 5,794,422 A | * | 8/1998 | Reimers et al. | 56/11.9 |
| 6,293,077 B1 | | 9/2001 | Plas et al. | |
| 6,347,502 B1 | | 2/2002 | deVries | |
| 6,494,028 B2 | | 12/2002 | Moore | |
| 6,533,044 B2 | | 3/2003 | Pierce et al. | |
| 6,588,188 B2 | | 7/2003 | Dennis | |
| 6,658,829 B2 | * | 12/2003 | Kobayashi et al. | 56/10.5 |
| 6,868,658 B2 | | 3/2005 | Velke et al. | |
| 6,935,093 B2 | | 8/2005 | Velke et al. | |
| 2007/0012016 A1 | | 1/2007 | Strope | |

* cited by examiner

*Primary Examiner*—Alicia M Torres
(74) *Attorney, Agent, or Firm*—Renner, Otto, Boisselle & Sklar, LLP

(57) ABSTRACT

A mower deck lift mechanism for a lawn mower includes a mower deck, a linkage mechanism for movably mounting the mower deck to the frame for raising and lowering movement relative to the frame, and an electro-hydraulic actuator assembly connected to the linkage mechanism for raising and lowering the mower deck relative to the frame. The actuator assembly is an integrated unit including a hydraulic piston-cylinder assembly connected to the linkage mechanism, a pump for supplying pressurized fluid to the piston-cylinder assembly, and an electric motor for driving the pump.

14 Claims, 2 Drawing Sheets

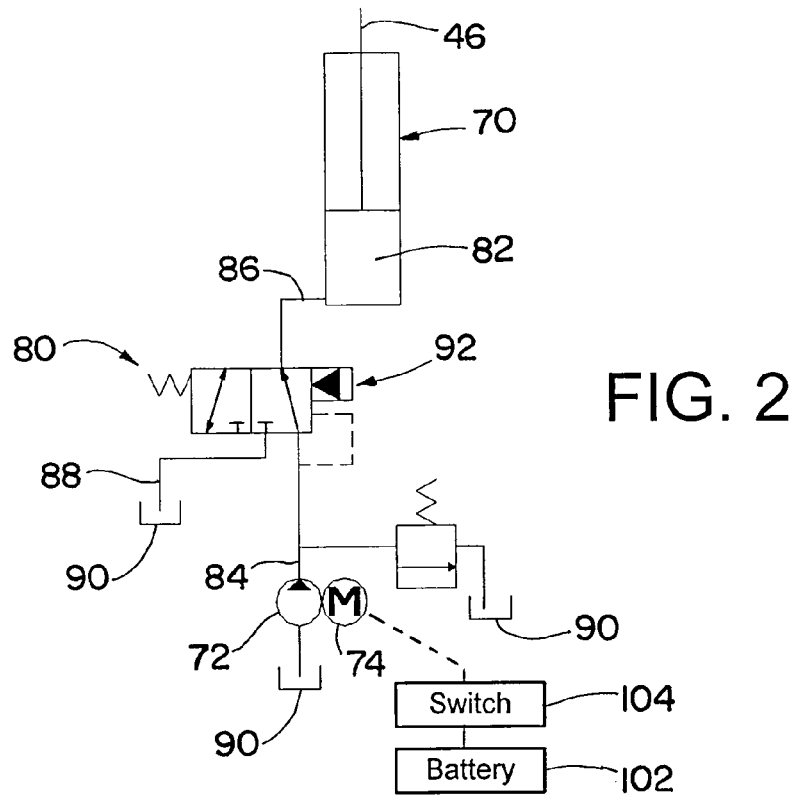
FIG. 2
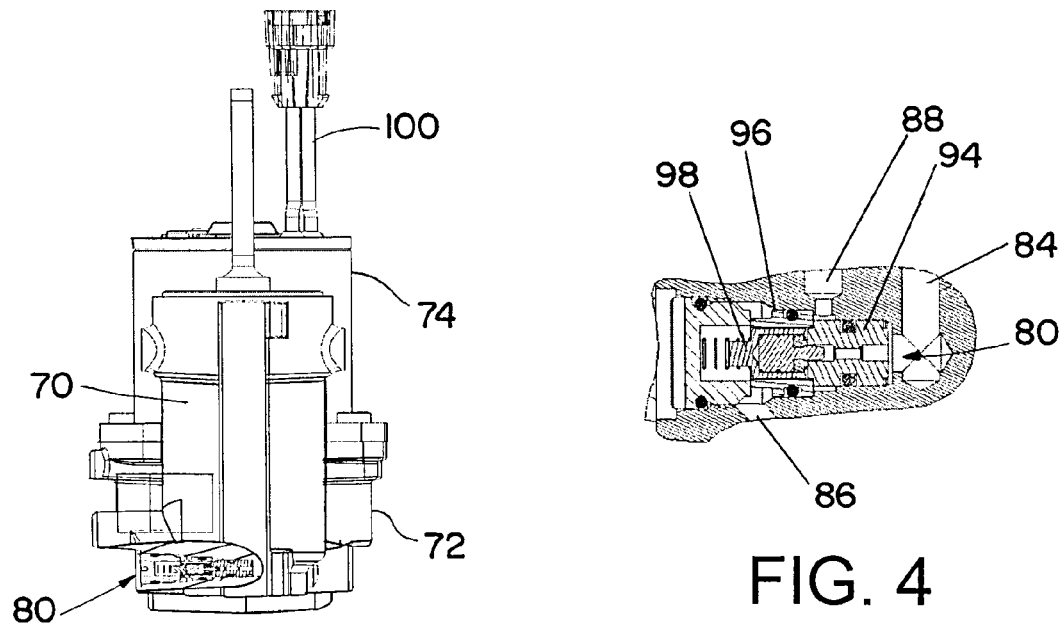
FIG. 3
FIG. 4

ELECTRO-HYDRAULIC LIFT MECHANISM FOR LAWN MOWER DECK

FIELD OF THE INVENTION

The herein described invention relates generally to lawn mowers and more particularly to a lift assembly for raising and lowering the mower deck of the lawn mower. A reference herein to lawn mower or lawn mowers is intended to encompass lawn mowers of various types, in particular riding lawn mowers that are also commonly referred to as lawn tractors and garden tractors.

BACKGROUND OF THE INVENTION

A number of known devices heretofore have been used for lifting a mower deck on a riding mower to a transport or height adjust position. These devices typically include a hand actuated lift lever. Hand adjustment lift levers can require considerable force to raise a mower deck, particularly larger decks.

Pedal-operated lifting mechanisms also are known. The pedal may include a locking mechanism for locking the deck in an uppermost position. In some lawn mowers, the pedal operated lifting mechanism is used to raise the deck to an elevated position so that a deck height adjustment mechanism, such as a rotatable cam or adjustment pin, can be adjusted, after which the deck is lowered to the adjusted position.

Another deck attachment and lift mechanism disclosed in U.S. Pat. No. 6,293,077 mentions the use of a hydraulic cylinder to raise and lower the deck.

Lawn and garden tractors also have used lift cylinders to control the position (lifting and lowering) of a hitch mounted to the back of the tractor. Typically, the position control includes a mechanical linkage that opens and closes a pair of hydraulic valves and allows a lift cylinder to move up and down.

SUMMARY OF THE INVENTION

The present invention provides an electro-hydraulic lift mechanism for a lawn mower wherein an integrated electro-hydraulic actuator assembly is used to provide for easy lifting of a mower deck. A preferred actuator assembly is a self-contained unit including a hydraulic piston-cylinder assembly, a pump for supplying pressurized fluid to the piston-cylinder assembly, and an electric motor for driving the pump. In a preferred embodiment, the actuator assembly can be powered even when the prime mover (e.g. internal combustion engine) of the lawn mower is not running, by connection to the battery of the lawn mower. The power requirements and/or overall package size of the integrated electro-hydraulic actuator assembly can be less than those of a system where an electrical motor is connected directly to the mower deck linkage mechanism, and yet such assembly can still provide sufficient power to lift the mower deck. Overall, this provides improved efficiency.

In a preferred embodiment, a user can simply activate a switch that will energize the electric motor that drives the pump to actuate the piston-cylinder assembly and raise the mower deck.

More particularly, a mower deck lift mechanism for a lawn mower comprises a mower deck, a linkage mechanism for movably mounting the mower deck to the frame for raising and lowering movement relative to the frame, and an electro-hydraulic actuator assembly connected to the linkage mechanism for raising and lowering the mower deck relative to the frame. The actuator assembly includes a hydraulic piston-cylinder assembly connected to the linkage mechanism, a pump for supplying pressurized fluid to the piston-cylinder assembly, and an electric motor for driving the pump.

In a preferred embodiment, the piston-cylinder assembly, pump and motor are an integral unit that may have a pivot connection, such as trunnions, for pivotal mounting to the frame of the lawn mower.

An adjustable stop may be provided for limiting the extent the mower deck can be lowered to an adjustment position while allowing the mower deck to move upwardly from the adjustment position. The actuator assembly is operable to raise the mower deck to a level that permits adjustment of the adjustable stop under a no load condition.

The piston-cylinder assembly may include a piston rod connected to a crank, and the crank in turn may be connected to the linkage mechanism such that rotation of the crank effects raising or lowering of the mower deck. The linkage mechanism may include a pair of shafts, each shaft having for rotational movement therewith a lift arm and a connecting arm. The lift arms may have distal ends connected to respective hangers from which the mower deck is suspended, and the connecting arms may have distal ends connected to a common connector link whereby rotation of one shaft will effect rotation of the other shaft.

In a preferred embodiment, the actuator assembly includes valving that supplies pressurized fluid from the pump to the piston-cylinder assembly when the motor is energized, and returns fluid from the piston-cylinder assembly when the motor is not energized, whereby movement of the piston-cylinder assembly is not inhibited when the motor is not energized. The valving may include a pilot operated check valve assembly including an inlet connected to the outlet of the pump, an outlet connected to a working chamber in the piston-cylinder assembly, a return connected to a reservoir, a pilot valve movable from a first position by fluid pressure at the inlet to a second position connecting the inlet to the outlet for flow of pressurized fluid to the working chamber of the piston-cylinder assembly. The pilot valve in the first position may connect the working chamber of the piston-cylinder assembly to the return for allowing flow of fluid from the working chamber to the reservoir. The return may have therein an orifice for restricting the rate of flow of fluid to the reservoir for lowering of the mower deck at a controlled rate.

As above noted, the electrical motor may be connected to the battery of the lawn mower by a manually operable switch for connecting and disconnecting the motor to the battery, whereby the deck can be raised even when the prime mover (e.g. internal combustion engine) of the lawn mower is not running.

Further features of the invention will become apparent from the following detailed description when considered in conjunction with the drawings.

BRIEF DESCRIPTION OF DRAWINGS

In the annexed drawings:

FIG. 2 is an exemplary hydraulic circuit employed in the lift mechanism;

FIG. 3 is an elevational view of an electro-hydraulic actuator unit used in the lift mechanism, partly broken away to show the location of valving; and FIG. 4 is an enlarged cross-sectional view of the valving.

DETAILED DESCRIPTION

Figure 1:
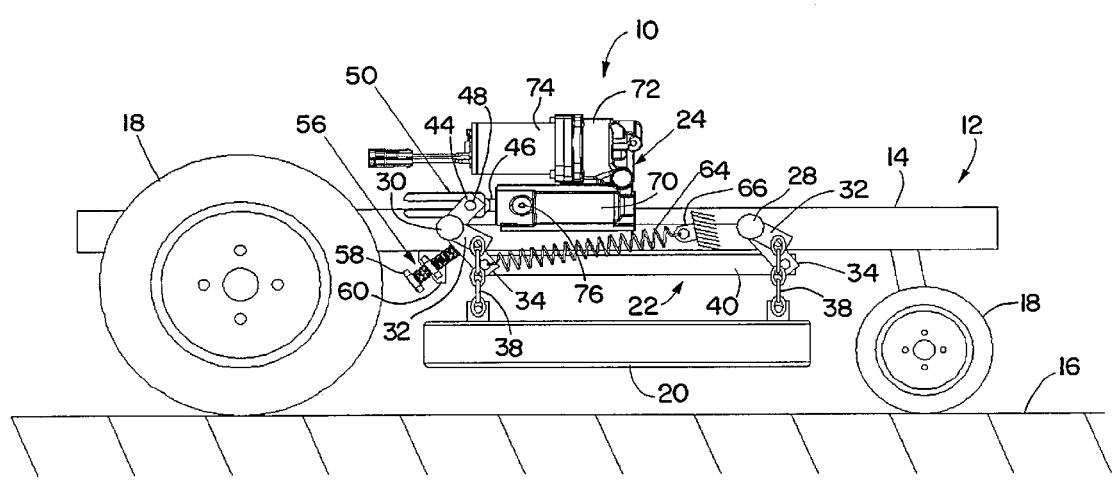
FIG. 1 is an elevational view of a lawn mower including an exemplary mower deck lift mechanism according to the invention.

Referring now to the drawings in detail and initially to FIG. 1, an exemplary mower deck lift mechanism according to the invention is indicated generally at 10. The mower deck lift mechanism is shown attached to a lawn mower 12 which may be of any of a variety of types, many of which are commonly referred to as riding mowers, lawn tractors, garden tractors, zero-turn mowers, etc. The lawn mower 12 includes a frame 14 supported above the ground 16 by wheels 18 as in a conventional manner. The lawn mower will of course include other components, such as an internal combustion engine for rotating the cutting blade or blades of the mower deck and/or for driving one or more of the wheels 18 for moving the lawn mower along the ground 16. These other components need not be described or shown as those skilled in the art will be intimately familiar with the omitted components, all which may be conventional.

The mower deck lift mechanism 10 generally comprises a mower deck 20, a linkage mechanism 22 for movably mounting the mower deck to the frame for raising and lowering movement relative to the frame, and an electro-hydraulic actuator assembly 24 connected to the linkage mechanism for raising and lowering the mower deck relative to the frame 14. Although the principles of the invention can be utilized in conjunction with a variety of different types of linkage mechanism, the illustrated exemplary linkage mechanism comprises front and rear lift shafts 28 and 30 mounted to the frame 14 by any suitable means for rotation (pivotal movement). Each lift shaft has at each end thereof a lift arm 32 and a connecting arm 34. The mower deck 20 is suspended from the radially outer or distal ends of the lift arms hangers 38. In the illustrated embodiment, the hangers are link chains which allow the deck to rise up and/or shift relative to the frame independently of the actuator assembly 24, as is desirable if the mower deck contacts an obstruction or the ground when being driven over the ground.

The connecting arms 34 at each side of the frame 14 (only the right hand side is shown in FIG. 1, the opposite side being essentially a mirror image thereof) have their radially outer or distal ends connected to a common connector link 40 whereby rotation of one lift shaft 28, 30 will effect rotation of the other shaft. In the illustrated embodiment, the rear lift shaft 30 has a further crank arm 44 that is connected to the end of a linearly movable rod 46 of the actuator assembly 24. In the illustrated embodiment, such connection is effected by a pin 48 that is received in a slot in a clevis 50 attached to the end of the rod 46. The slot may be closed at both ends or open at one end as shown, the latter facilitating assembly of the actuator assembly to the linkage mechanism 22.

As will be appreciated, extension of the rod 46 will cause the closed end of the slot to engage the pin 48 to cause the crank arm 44 to rotate counter-clockwise in FIG. 1. This will in turn cause the lift arms 32 of the lift shafts 28 and 30 to rotate counter-clockwise and lift the mower deck 20. Upon retraction of the rod 46, the deck will be lowered until further lowering of the deck is prevented by an adjustable stop mechanism 56. Various stop mechanisms are known to those skilled in the art, such as adjustable pins, eccentric wheels, etc. that interfere with and thus block movement of one or more of the moving components of the mechanism to set a cutting height of the mower deck. In the illustrated embodiment, a threaded stop pin 58 is used to limit downward rotation of the connecting arm 34 of the rear lift shaft 30. The stop pin is threaded into a bracket 60 attached to the frame 14. Rotation of the stop pin will determine the extent to which the connecting arm 34 on the shaft 30 can rotate downwardly, thereby setting the cutting height of the mower deck. The stop pin, or other stop mechanism, can be easily adjusted when the weight of the mower deck acting thereon is removed upon extension of the rod 46 of the actuator assembly. As is desired, the weight of the mower deck is substantially counterbalanced by suitable means, such as for example the counterbalance spring 64 connected between a mounting bracket 66 on the frame and the distal end of the connecting arm 34 on the rear lift shaft 30.

As illustrated in FIGS. 1-3, the actuator assembly 24 includes a hydraulic piston-cylinder assembly 70, a pump 72, such as a gear pump, for supplying pressurized hydraulic fluid to the piston-cylinder assembly, and an electric motor 74 for driving the pump. As will be appreciated by those in the art, the power requirements and/or overall package size of the integrated electro-hydraulic actuator assembly can be less than those of a system where an electrical motor is connected directly to the mower deck linkage mechanism, and yet such assembly can still provide sufficient force to lift the mower deck.

In a preferred embodiment, the piston-cylinder assembly 70, pump 72 and motor 74 are an integral unit. Such unit may be, for example, the type of unit previously successfully used as tilt and trim actuators in marine applications. The unit 24 may have a pivot connection, such as laterally opposed trunnions 76, for pivotal mounting to the frame 14 of the lawn mower, as by means of journals.

The actuator assembly/unit 24 includes valving 80 that supplies pressurized fluid from the pump 72 to a working chamber 82 (an extend chamber in the illustrated embodiment) of the piston-cylinder assembly 70 when the motor 74 is energized, and returns fluid from the piston-cylinder assembly when the motor is not energized, whereby movement of the piston-cylinder assembly is not inhibited when the motor is not energized. The valving 80 may be a pilot operated 3-way valve assembly including an inlet 84 connected to the outlet of the pump, an outlet 86 connected to the working chamber 82 of the piston-cylinder assembly, a return 88 connected to a reservoir 90, a pilot valve 92 movable from a first position by fluid pressure at the inlet to a second position (shown in FIG. 2) connecting the inlet to the outlet for flow of pressurized fluid to the working chamber of the piston-cylinder assembly. The pilot valve in the first position may connect the working chamber of the piston-cylinder assembly to the return for allowing flow of fluid from the working chamber to the reservoir. The return may have therein an orifice for restricting the rate of flow of fluid to the reservoir for lowering of the mower deck at a controlled rate. The valving may also be provided with a pressure relief valve as shown in FIG. 2.

With reference to the valving structure shown in FIG. 4, a spool 94 will shift and mate with the check seat 96 when pressure is at pump port 84. The spool will seal against the check seat and the poppet 98 will lift off its seat to allow fluid to flow through the spool and around the poppet 98 through passages between the poppet and the check seat member (the outer member of the poppet may have a hexagonal outer surface forming axial passages), and to the outlet 86 for flow to the actuator. Once the motor shuts off and pressure at the inlet 84 decays, the poppet will close against the spool and the spool will shift to the right in FIG. 4 so that it is no longer seated against the check valve seat. This establishes a flow path from the outlet 86, around the poppet 98 and to the return 88, thereby allowing the fluid from the cylinder to flow back through passageway back to tank.

As above noted, the electrical motor 74 may be connected, as by a suitable electrical connection 100 (FIG. 3), to the battery 102 (FIG. 2) of the lawn mower by a manually operable switch 104 for connecting and disconnecting the motor to the battery, whereby the deck can be raised even when the prime mover (e.g. internal combustion engine) of the lawn mower is not running. It is noted that as is preferred, pressurized hydraulic fluid comes from the motor driven pump of the self-contained unit, rather than from another hydraulic system of the vehicle used for other purposes, such as for driving one or more wheels of the lawn motor.

In an exemplary use, the motor may be energized by pressing a button on the control panel of the lawn mower to raise the mower deck. The mower height adjustment mechanism can then be adjusted to provide a desired cutting height of the mower deck. The switch can then be deactivated to de-energize the motor and allow the mower deck to lower until further lowering is prevented by the mower deck height adjustment mechanism. The piston-cylinder assembly is free to retract to accommodate such lowering of the mower deck.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mower deck lift mechanism for a lawn mower having a frame, the mower deck lift mechanism comprising:
    a mower deck;
    a linkage mechanism for movably mounting the mower deck to the frame for raising and lowering movement relative to the frame; and
    an electro-hydraulic actuator assembly connected to the linkage mechanism for raising and lowering the mower deck relative to the frame, the actuator assembly including a hydraulic piston-cylinder assembly connected to the linkage mechanism, a pump for supplying pressurized fluid to the piston-cylinder assembly, and an electric motor for driving the pump; and
    wherein the actuator assembly includes valving that supplies pressurized fluid from the pump to the piston-cylinder assembly when the motor is energized, and returns fluid from the piston-cylinder assembly to a reservoir when the motor is not energized, whereby movement of the piston-cylinder assembly is not inhibited when the motor is not energized, wherein the valving includes a pilot operated check valve assembly including an inlet connected to the outlet of the pump, an outlet connected to a working chamber in the piston-cylinder assembly, a return connected to a reservoir, a pilot valve movable from a first position by fluid pressure at the inlet to a second position connecting the inlet to the outlet for flow of pressurized fluid to the working chamber of the piston-cylinder assembly, and the pilot valve in the first position connecting the working chamber of the piston-cylinder assembly to the return for allowing flow of fluid from the working chamber to the reservoir.

2. A mower deck lift mechanism as set forth in claim 1, wherein the piston-cylinder assembly, pump and motor are an integral unit having a pivot connection for pivotal mounting to the frame of the lawn mower.

3. A mower deck lift mechanism as set forth in claim 2, wherein the pivot connection includes a pair of transversely opposed trunnions.

4. A mower deck lift mechanism as set forth in claim 1, further comprising an adjustable stop for limiting the extent the mower deck can be lowered to an adjustment position while allowing the mower deck to move upwardly from the adjustment position, and wherein the actuator assembly is operable to raise the mower deck to a level that permits adjustment of the adjustable stop under a no load condition.

5. A mower deck lift mechanism as set forth in claim 1, wherein the piston-cylinder assembly includes a piston rod connected to a crank, and the crank is in turn connected to the linkage mechanism such that rotation of the crank effects raising or lowering of the mower deck.

6. A mower deck lift mechanism as set forth in claim 1 wherein the linkage mechanism includes a pair of shafts, each shaft having for rotational movement therewith a lift arm and a connecting arm, the lift arms having distal ends connected to respective hangers from which the mower deck is suspended, and the connecting arms having distal ends connected to a common connector link whereby rotation of one shaft will effect rotation of the other shaft.

7. A mower deck lift mechanism as set forth in claim 6, wherein the piston-cylinder assembly includes a piston rod connected to a crank connected to one of the shafts for raising or lowering of the mower deck.

8. A mower deck lift mechanism as set forth in claim 1, wherein the return has therein an orifice for restricting the rate of flow of fluid to the reservoir for lowering of the mower deck at a controlled rate.

9. A mower deck lift mechanism as set forth in claim 1, in combination with the lawn mower.

10. A combination as set forth in claim 9, wherein the mower deck lift mechanism is mounted to the frame of the lawn mower.

11. A combination as set forth in claim 9, wherein the lawn mower includes a battery, and the electrical motor is connected to the battery by a manually operable switch for connecting and disconnecting the motor to the battery.

12. A combination as set forth in claim 9, further comprising a counterbalancing spring connected between the linkage mechanism and the frame for at least partially counterbalancing the weight of the mower deck.

13. A mower deck lift mechanism for a lawn mower having a frame and a mower deck, the lift mechanism comprising:
    a linkage mechanism for movably mounting the mower deck to the frame for raising and lowering movement relative to the frame;
    an actuator assembly connected to the linkage mechanism for raising and lowering the mower deck relative to the frame, the actuator assembly including a hydraulic piston-cylinder assembly connected to the linkage mechanism, a pump for supplying pressurized fluid to the piston-cylinder assembly, and an electric motor for driving the pump; and
    wherein the actuator assembly includes valving that supplies pressurized fluid from the pump to the piston-cylinder assembly when the motor is energized, and returns fluid from the piston-cylinder assembly to a reservoir when the motor is not energized, whereby movement of the piston-cylinder assembly is not inhibited when the motor is not energized, wherein the valving includes a pilot operated check valve assembly including an inlet connected to the outlet of the pump, an outlet connected to a working chamber in the piston-cylinder assembly, a return connected to a reservoir, a pilot valve movable from a first position by fluid pressure at the inlet to a second position connecting the inlet to the outlet for flow of pressurized fluid to the working chamber of the piston-cylinder assembly, and the pilot valve in the first position connecting the working chamber of the piston-cylinder assembly to the return for allowing flow of fluid from the working chamber to the reservoir.

14. A mower deck lift mechanism as set forth in claim 13, wherein the return has therein an orifice for restricting the rate of flow of fluid to the reservoir for lowering of the mower deck at a controlled rate.

\* \* \* \* \*